No. 770,733. PATENTED SEPT. 27, 1904.
I. A. BARBERG.
MOWER.
APPLICATION FILED DEC. 19, 1903.
NO MODEL. 3 SHEETS—SHEET 1.
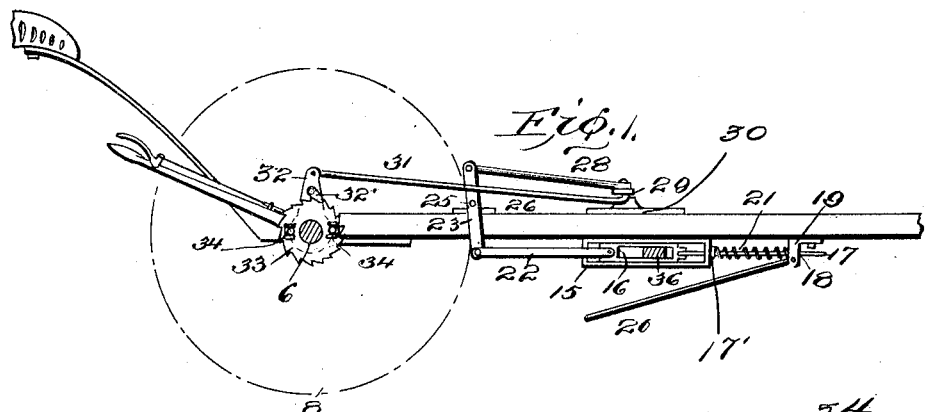
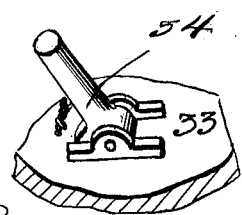
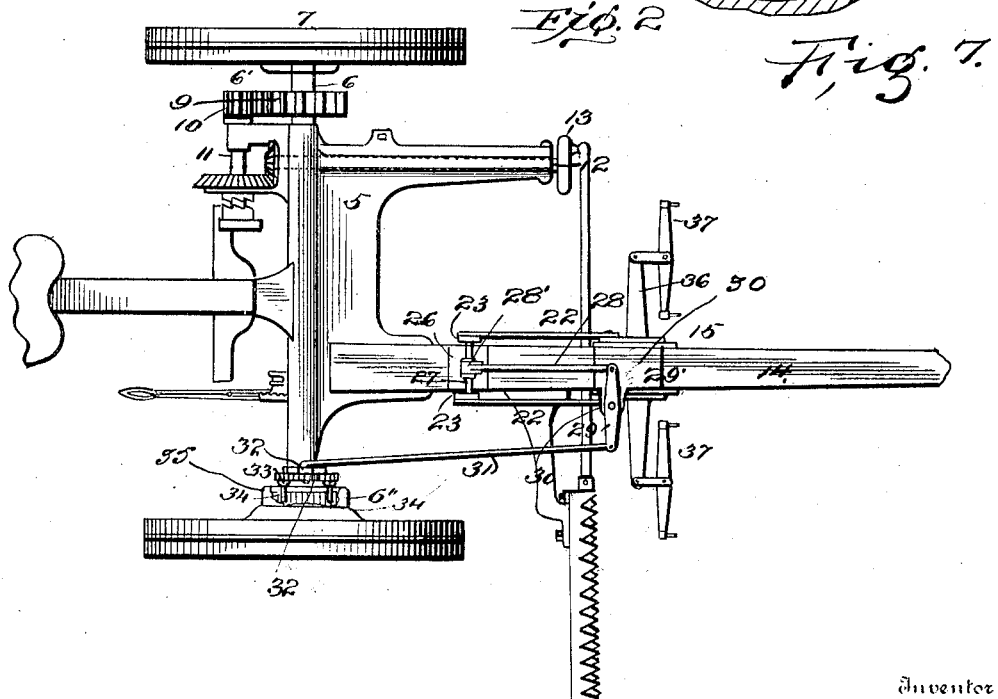
Witnesses
Inventor
I. A. Barberg.

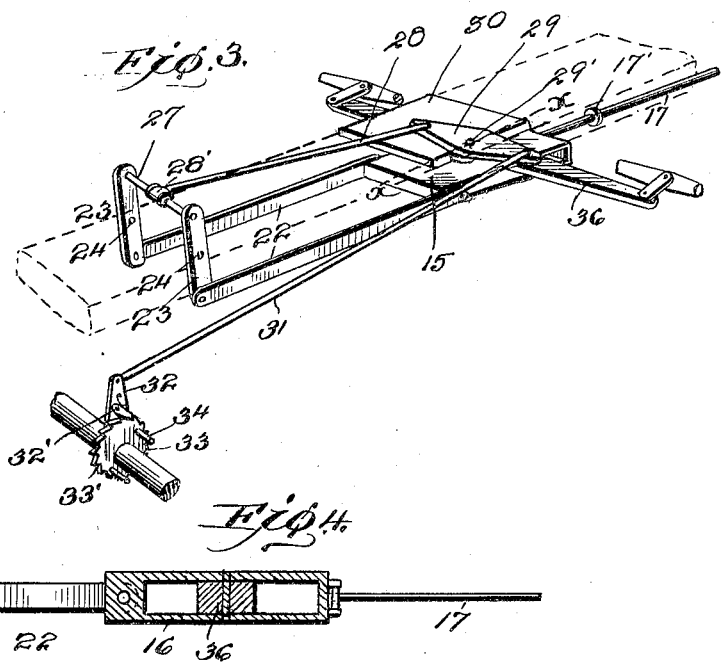

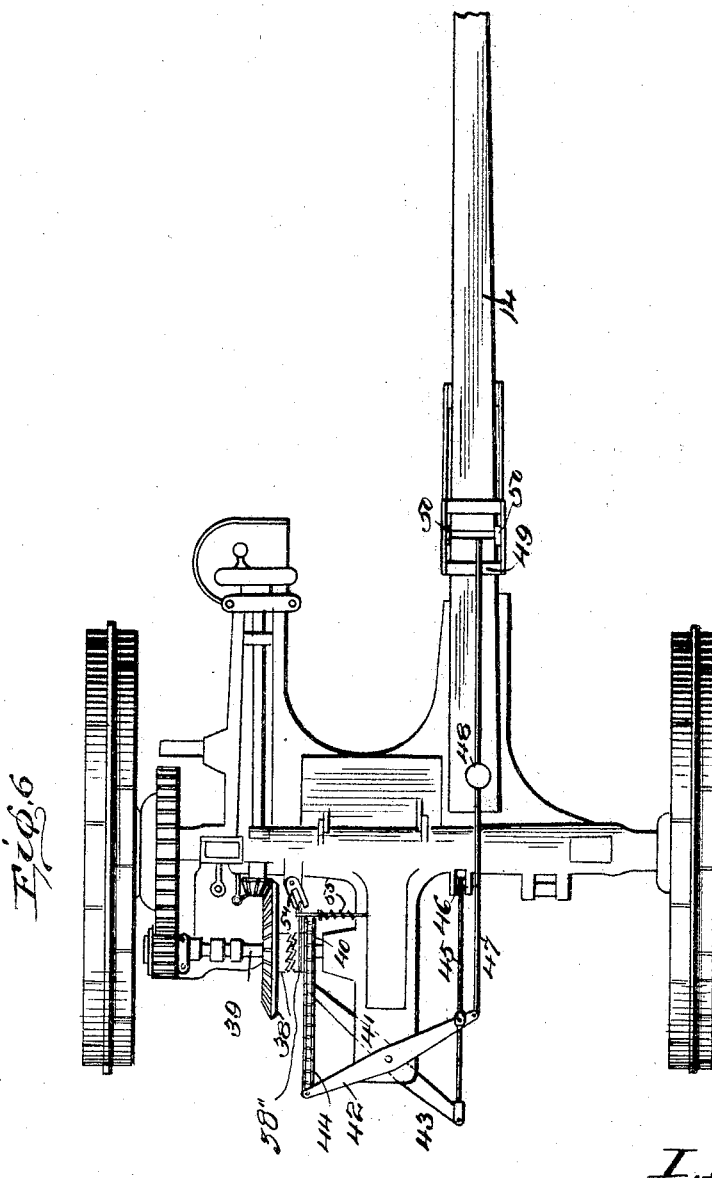

No. 770,733.

Patented September 27, 1904.

UNITED STATES PATENT OFFICE.

ISAAC A. BARBERG, OF COKATO, MINNESOTA.

MOWER.

SPECIFICATION forming part of Letters Patent No. 770,733, dated September 27, 1904.

Application filed December 19, 1903. Serial No. 185,860. (No model.)

*To all whom it may concern:*

Be it known that I, ISAAC A. BARBERG, a citizen of the United States, residing at Cokato, in the county of Wright, State of Minnesota, have invented certain new and useful Improvements in Mowers; and I do hereby declare the following to be a full, clear, and exact description of the invention, such as will enable others skilled in the art to which it appertains to make and use the same.

This invention relates to farm implements, and more particularly to mowers, and has for its object to provide a mechanism which will operate to set the cutter-bar in motion before the drive-wheels are started.

At present when it is desired to start a mower when the cutter-bar is lying in thick or tough grass it is necessary to back the entire machine in order to withdraw the knives from the grass and to give the knives sufficient movement before again striking the grass as to enable them to cut through the stems. Unless this is done the stems of the grass become caught between the fingers and reciprocation of the cutter-bar is prevented.

In the present invention the construction is such that the cutter-bar is given a quick movement before the drive-wheels start, which cuts the grass then lying between the fingers, allowing the knives to be readily started by the drive-wheels.

In the drawings forming a portion of this specification, in which like numerals of reference indicate similar parts in the several views, Figure 1 is a side elevation of a mower equipped with the present invention. Fig. 2 is a top plan view of Fig. 1. Fig. 3 is a detail perspective view of the portion of the machine comprising the present invention. Fig. 4 is a section of the cross-head, taken on line *x x* of Fig. 3. Fig. 5 is a detail perspective view of a portion of a modification. Fig. 6 is a top plan view of a modified form of the invention. Fig. 7 is a detailed perspective view of one of the dogs.

Referring now to the drawings, there is shown a mower comprising the usual cast framework 5, carrying the axle 6, upon which are mounted wheels 7 and 8, which have the usual clutch connections 6' and 6'' with the axle. The axle carries the usual gear-wheel 9, which meshes with a pinion 10 upon the countershaft 11, which is geared, by means of bevel-gears, to a shaft 12, which through the medium of the pitman 13 operates the cutter-bar. So far as already described the device is of the construction usually found in these implements. The frame 5 also carries the usual draft-beam 14. To the under side of the beam 14 there is attached a guide-frame 15, in which is disposed a slide or cross-head 16, to the forward end of which there is attached a rod 17. The forward end of the rod 17 lies in a perforation 18 in a bracket 19, to which is attached the usual rod 20, which supports the end of the cutter-bar. The rod 17 carries a collar 17' and upon the rod between the collar and the bracket there is a helical spring 21. To the rearward end of the cross-head there are pivoted a pair of arms 22, which are pivoted at their free ends to upright levers 23, which have perforations 24 at their centers. These perforations 24 are disposed upon a pivot-pin 25, carried by a bracket 26, secured to the beam 14. A rod 27 connects the upper ends of the levers 23, and upon this rod there is disposed the loop end 28' of a pitman 28, which is connected at its remaining end to a horizontal lever 29, pivoted at its center upon a pin 29', carried by a bracket 30, which is also secured to the upper face of the beam 14. The remaining end of the lever 29 is connected, by means of a pitman 31, to an arm 32, which is connected with the axle 6. The connection of the arm 32 with the axle 6 is through a portion of the clutch mechanism 6'', by which the power of the wheel 8 is given to the axle. This clutch mechanism, as is usual in machines of this kind, consists of a disk 33, having dogs 34 projecting from one of its faces, which are engaged by a tooth-disk 35, carried by the wheel. From this construction it will be seen that when the wheels are turned forwardly, as is the case when the machine is drawn over the ground, the movement of the wheels will be transmitted to the axle, but that the axle may be turned forwardly independently of both wheels. The disk 33 is formed with ratchet-teeth 33' thereon, and the arm 32 is mounted upon the axle 6 and carries a dog 32' for engagement of the teeth 33'. Pivoted in the cross-head 16 is a doubletree 36, to which are secured swingletrees 37.

In operation when the team is started and strain is thus brought upon the doubletree 36 the cross-head is drawn forwardly, which compresses the spring 21 and through the lever-and-pitman mechanism just described draws the arm 32 forwardly, which through the ratchet-teeth 33' and arm 32 turns the axle 6 and reciprocates the cutter-bar, the usual clutches 6' and 6" permitting the axle 6 to be turned without revolving the wheels 7 and 8. It will thus be seen that the cutter-bar is actuated by the entire strength of the team and is thus enabled to cut the stems of the grass. When the team is stopped, the spring 21 expands, which causes the mechanism to return to its original position.

In Fig. 6 of the drawings there is shown a mower in which the starting mechanism is applied to the counter-shaft. In this form the counter-shaft is provided with a clutch 38, one member, 38', of which is carried by the shaft 39. The other member, 38", is slidable upon the shaft and carries a sprocket-wheel 40. To the rearwardly-extending portion 41 of the machine, to which the seat-spring is attached, there are pivoted a pair of horizontal levers 42 and 43, one above and one below the portion 41, the ends thereof projecting beyond the sides of the portion 41. One end of each lever is attached to the end of a chain 44, which is engaged with the teeth of the sprocket-wheel 40, and the opposite ends of the levers are connected by means of a cable 45, which passes over a pulley 46, carried by the frame. To the end of the lever 42 to which is attached the cable 45 there is also attached a rod 47, which passes through a guide 48, secured to the upper face of the beam 14. Adjacent to the forward end of the beam there is attached a framework 49, which projects upwardly therefrom and which has pivoted therein a pair of depending arms 50, the lower ends of which hang below the beam 14. These arms 50 are connected by a brace 51, to which the rod 47 is attached. The lower ends of the arms are connected, by means of links 52, to a slide 53, mounted similarly to the slide 16, and to this slide the whiffletree is attached. As in the preferred form, the helical spring 21 is provided to return the mechanism to its original position. A lever 54 is provided, by means of which the members 38' and 38" and clutch may be moved out of engagement, and a spring 55 is also provided which normally holds them in engagement.

In the operation of the modified form of the invention when the machine is started the arms 50 are moved in the framework 49, as will be readily understood, and this movement is communicated, through the rod 47, to the lever 42, which is moved upon its pivot, and through the medium of the chain 44 the shaft 39 is revolved to give the cutter-bars an initial movement before the wheels of the machine are set in motion. When the lever 42 is moved pivotally, the lever 43 is moved in the opposite direction, as will be readily understood, and when the machine is stopped the portions of the mechanism are returned to their original positions by the spring 21, as in the previously-described form of the invention.

In practice modifications of the specific construction shown may be made, and any suitable materials and proportions may be used without departing from the spirit of the invention.

What is claimed is—

1. A mower comprising a frame, wheels mounted upon the frame, a cutter-bar carried by the frame, connections between the wheels and the cutter-bar to operate the latter, a tongue connected to the frame, a guide secured to the under face of the tongue, a cross-head slidably mounted in the guide, a whiffletree pivoted to the cross-head, a bracket mounted forwardly of the guide and having a passage therethrough, a rod connected with the cross-head and slidably disposed in the passage, said rod having a collar thereon adjacent to the cross-head, a helical spring disposed upon the rod between the collar and the bracket, a lever pivotally mounted rearwardly of the guide, connections between the cross-head and the lever, and connections between the lever and the cutter-bar to operate the latter when the former is moved upon its pivot.

2. A mower comprising a frame having a tongue connected therewith, wheels mounted upon the frame, a cutter-bar carried by the frame, connections between the wheels and the cutter-bar to operate the latter, a shaft revolubly mounted in the frame, connections between the shaft and the cutter-bar for operation of the latter when the shaft is revolved, a sprocket-wheel mounted upon the shaft, a chain engaged with the sprocket-wheel, a lever connected at each end of the chain, said levers being pivotally mounted in the frame, a whiffletree slidably connected with the tongue, and connections between the whiffletree and the levers for movement of the latter upon their pivots when the whiffletree is slid.

In testimony whereof I affix my signature in presence of two witnesses.

ISAAC A. BARBERG.

Witnesses:
C. R. PETERSON,
F. SWANSEN.